United States Patent
Tamai et al.

(10) Patent No.: US 7,600,827 B2
(45) Date of Patent: Oct. 13, 2009

(54) ROLLBACK REDUCTION IN HYBRID OR CONVENTIONAL POWERTRAIN VEHICLE VIA VEHICLE STABILITY ENHANCEMENT SYSTEM (VSES)

(75) Inventors: Goro Tamai, West Bloomfield, MI (US); Jeff A. Simpson, Washington, MI (US); William L. Aldrich, III, Davisburg, MI (US); Birendra P. Bhattarai, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 569 days.

(21) Appl. No.: 11/233,870

(22) Filed: Sep. 23, 2005

(65) Prior Publication Data
US 2007/0096557 A1    May 3, 2007

(51) Int. Cl.
*B60T 11/00* (2006.01)
(52) U.S. Cl. .................................................. 303/191
(58) Field of Classification Search ......... 303/191–192; 192/220.1; 477/92–95
See application file for complete search history.

(56) References Cited

U.S. PATENT DOCUMENTS

| | | | | |
|---|---|---|---|---|
| 4,879,925 A | * | 11/1989 | Taga et al. | 192/219.1 |
| 5,820,515 A | * | 10/1998 | Fukaya et al. | 477/92 |
| 5,916,062 A | * | 6/1999 | Siepker | 477/194 |
| 6,315,372 B1 | * | 11/2001 | Kroger et al. | 303/191 |
| 6,364,436 B1 | * | 4/2002 | Sawada | 303/191 |
| 6,547,344 B2 | * | 4/2003 | Hada et al. | 303/191 |
| 7,000,998 B2 | * | 2/2006 | Hano et al. | 303/191 |
| 7,134,538 B2 | * | 11/2006 | Hasegawa et al. | 192/220.1 |
| 2002/0033642 A1 | * | 3/2002 | Holl | 303/191 |
| 2003/0137192 A1 | * | 7/2003 | Hano et al. | 303/192 |
| 2005/0029865 A1 | * | 2/2005 | Kobayashi | 303/191 |
| 2005/0200199 A1 | * | 9/2005 | Kamiya et al. | 303/191 |
| 2006/0111823 A1 | | 5/2006 | Tamai | 701/38 |

FOREIGN PATENT DOCUMENTS

| DE | 19912878 A1 | 4/2000 |
|---|---|---|
| DE | 102004026722 A1 | 1/2005 |

* cited by examiner

*Primary Examiner*—Christopher P Schwartz

(57) ABSTRACT

An anti-rollback control system for a vehicle having a brake system includes a brake pedal that is operable to induce a brake pressure in the brake system and a control module that holds the brake pressure equal to a hold pressure that is based on an incline angle to inhibit rollback of the vehicle when pressure is relieved from the brake pedal. The control module initiates forward propulsion of the vehicle based on a driver input and reduces the brake pressure from the hold pressure concurrent to initiating the forward propulsion.

33 Claims, 4 Drawing Sheets

ROLLBACK REDUCTION IN HYBRID OR CONVENTIONAL POWERTRAIN VEHICLE VIA VEHICLE STABILITY ENHANCEMENT SYSTEM (VSES)

FIELD OF THE INVENTION

The present invention relates to vehicle control systems, and more particularly to vehicle control systems for minimizing vehicle rollback.

BACKGROUND OF THE INVENTION

Vehicles travel along surfaces, such as a roadway, that are often graded or at an incline. In some instances, vehicles come to rest on the inclined surface. Vehicle rollback may occur during a vehicle launch from rest on the inclined surface. More specifically, during the period between brake pedal release by the driver and propulsion of the vehicle, gravity can induce vehicle movement down the inclined surface (i.e., rollback).

Hybrid powertrains typically turn off the engine when the vehicle is stopped and restart the engine when the brakes are released. Vehicle rollback may occur between the time that the brake pressure starts to decay due to pedal release, and the time that sufficient powertrain output torque is present. Some conventional powertrain control systems employ a neutral idle control strategy. In this case, the transmission is automatically moved to neutral while idling to reduce fuel consumption and/or idle vibration. Vehicle rollback can occur in the time between brake pedal release and shifting of the transmission back into gear to propel the vehicle.

Current anti-rollback systems require the implementation of additional components and/or complex control strategies. As a result, vehicle manufacture is more complex and costly than desired.

SUMMARY OF THE INVENTION

Accordingly, the present invention provides an anti-rollback control system for a vehicle having a brake system. The anti-rollback system includes a brake pedal that is operable to induce a brake pressure in the brake system and a control module that holds the brake pressure equal to a hold pressure that is based on an incline angle to inhibit rollback of the vehicle when pressure is relieved from the brake pedal. The control module initiates forward propulsion of the vehicle based on a driver input and reduces the brake pressure from the hold pressure concurrent to initiating the forward propulsion.

In one feature, the anti-rollback control system further includes a brake pressure line-lock solenoid that is selectively actuated to hold the brake pressure at the hold pressure.

In other features, the control module determines the hold pressure based on a minimum hold pressure, a driver pressure and a maximum hold pressure. The driver pressure is determined based on a brake pedal position. The minimum hold pressure is determined based on the incline angle.

In another feature, the anti-rollback control system further includes an inclinometer that determines the incline angle.

In other features, the control module gradually reduces the brake pressure to zero. Gradual reduction of the brake pressure is based on a rotational speed of a propulsion mechanism. Alternatively, gradual reduction of the brake pressure is based on a clutch-fill rate of a transmission.

In still another feature, a rate of reduction of the brake pressure from the hold pressure is based on an accelerator pedal position.

In yet another feature, the control module maintains the brake pressure at the hold pressure for a threshold time after initiating forward propulsion of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
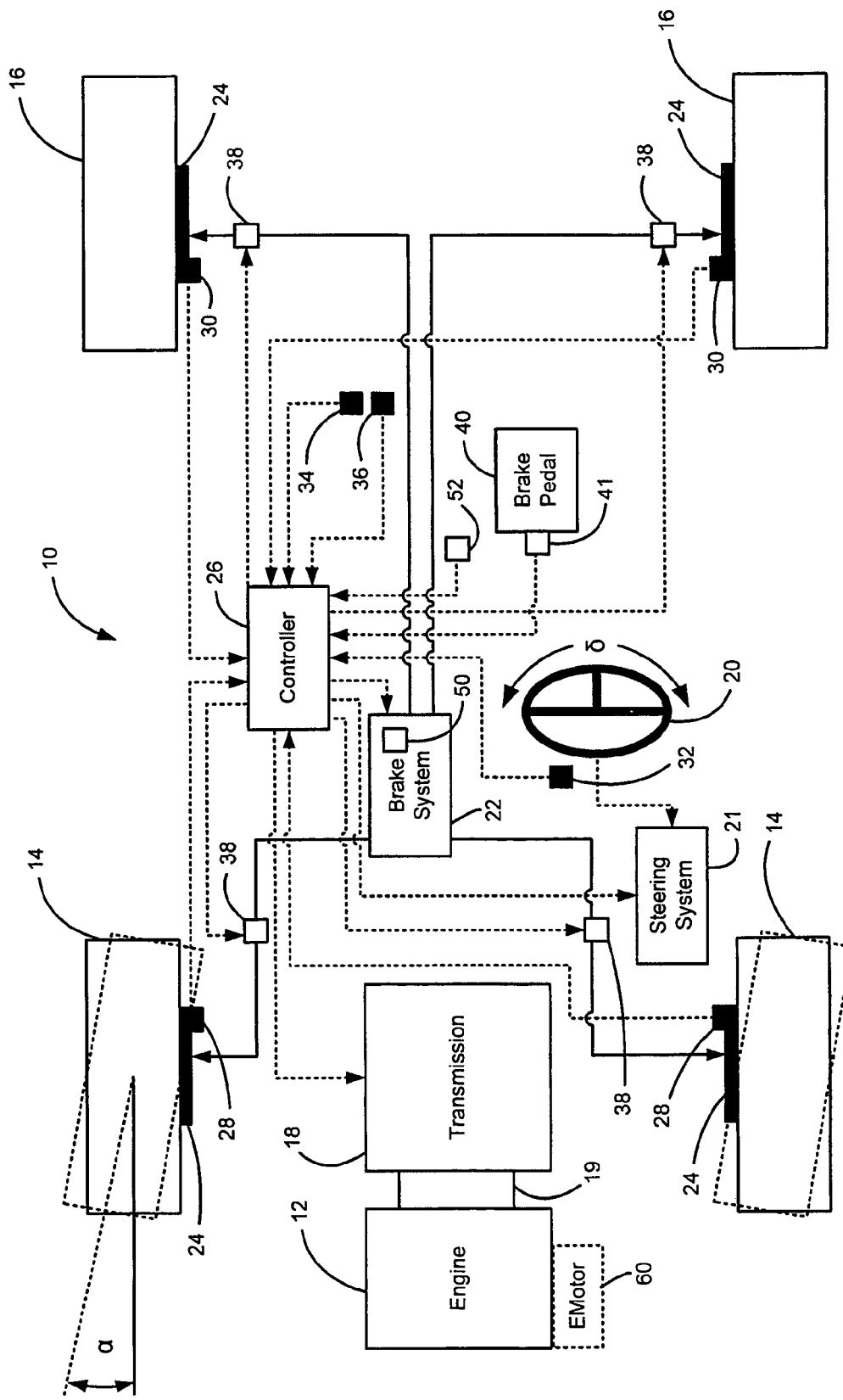
FIG. 1 is a functional block diagram of a vehicle including a vehicle stability enhancement system (VSES)

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a vehicle 10 is schematically illustrated. The vehicle 10 includes an engine 12 that produces drive torque that is transferred to front and/or rear road wheels 14,16, respectively. The drive torque is transferred through a transmission 18 to the road wheels 14,16. A steering wheel 20 enables a vehicle operator to steer the front road wheels 14 to a desired steering angle ($\alpha$). More specifically, the steering wheel 20 is an input to a steering system 21 that steers the front road wheels 14. The vehicle 10 also includes a brake system 22 having a master cylinder (not shown) that feeds pressurized fluid to brakes 24 located at each of the road wheels 14,16.

The vehicle 10 includes a control module 26 that monitors and controls vehicle operation based on the integrated control of the present invention. Wheel speed sensors 28,30 generate wheel speed signals for the road wheels 14,16, respectively, which are communicated to the control module 26. A steering wheel angle sensor 32 generates a steering wheel angle signal that is received by the control module 26. A steering wheel angle ($\delta$) is determined based on the steering wheel angle signal. A yaw rate sensor 34 generates a yaw rate signal and a lateral accelerometer 36 generates a lateral acceleration signal, both of which are communicated to the control module 26. The control module 26 controls brake actuators 38 associated with each brake 24 to modulate brake force to the road wheels 14,16. The control module 26 actively controls the brakes 24 based on the integrated control described herein. The vehicle operator manipulates a brake pedal 40 based on a brake sensor 41 that generates a brake pressure signal and the control module 26 operates the braking system to control braking of the road wheels based on the brake position signal.

The vehicle includes a vehicle stability enhancement system, (VSES). The VSES incorporates the various sensors and actuators described herein and controls vehicle operation via the control module 26. More particularly, the VSES includes software-based algorithms processed by the control module 26 as well as mechanical components. Control signals generated by the control module 26 are based on the software-based algorithms. The control signals control operation of the mechanical components associated with the VSES.

The VSES electronically influences the steering angle ($\alpha$) of the road wheels 14 based on operator steering input (i.e., steering wheel angle ($\delta$)) and vehicle speed. The VSES also influences the steering angle ($\alpha$) based on feedback from sensors such as the yaw rate sensor 34. The control module 26 generates a corrected steering angle ($\alpha_{CORR}$) that is greater than, equal to or less than a target steering angle ($\alpha_{TARGET}$) based on the steering wheel angle ($\delta$). In other words, the VSES can turn the road wheels 14 at angle that is different than the indicated angle to which the vehicle operator turns the steering wheel 20.

The VSES also aids the vehicle operator in controlling the vehicle 10 when driving on dangerous surfaces including wet pavement, ice, snow and gravel or when the vehicle operator makes sudden maneuvers. The VSES includes various sensors that help determine wheel skid. More particularly, the VSES monitors the relationship between $\delta$ and $\alpha_{CORR}$, the vehicle speed, yaw rate and other factors. The VSES reduces engine torque and selectively actuates one or more of the brakes 24 to maintain vehicle movement along an intended path. More particularly, the control module 26 generates a yaw rate command ($YR_{COM}$) based on steering angle and vehicle speed. A yaw rate error ($YR_{ERR}$) is determined as the difference between $YR_{COM}$ and the measured yaw rate ($YR_{MEAS}$). $YR_{MEAS}$ is determined based on the yaw rate signal generated by the yaw rate sensor. The VSES operates to minimize the yaw rate error ($YR_{ERR}$).

The VSES includes a brake pressure line-lock solenoid 50 in the brake system 22 that is selectively actuated between ON and OFF states. In the ON state, the brake pressure line-lock solenoid 50 holds the brake pressure at a desired level. The VSES further includes an inclinometer 52 that generates an inclined signal based on an incline angle ($\beta_{INCLINE}$) of a surface on which the vehicle travels. An exemplary inclinometer is disclosed in commonly assigned U.S. patent application Ser. No. 10/996,095 filed on Nov. 23, 2004 and entitled Anti-Rollback Control Via Inclinometer For Hybrid and Conventional Drivetrains, the disclosure of which is expressly incorporated herein by reference. It is anticipated, however, that $\beta_{INCLINE}$ can be determined in an alternative manner. For example, $\beta_{INCLINE}$ can be determined from an incline model that is processed by the control module 26 based on various operating parameters.

The anti-rollback control of the present invention utilizes VSES components, the brake pressure line-lock solenoid 50 in particular, to inhibit rollback during vehicle launch. More specifically, when the vehicle is stopped and a brake pressure ($P_{BRAKE}$) is applied, the anti-rollback control determines a minimum brake line pressure ($P_{MIN}$) that is required to inhibit vehicle movement based on $\beta_{INCLINE}$. For example, $P_{MIN}$ can be determined from a look-up table based on $\beta_{INCLINE}$. A driver desired brake line pressure ($P_{DRV}$) is determined based on the brake position signal (BPS). A maximum brake line pressure ($P_{MAX}$) is provided and is a reasonable maximum brake line pressure required to prevent vehicle rollback on a large incline. $P_{MAX}$ is a predetermined value that is stored in memory and is based on vehicle parameters including, but not limited to, gross vehicle weight. The anti-rollback control determines a rollback hold pressure ($P_{HOLD}$) according to the following relationship:

$$P_{HOLD} = \mathrm{MIN}[(P_{MIN}+P_{DRV}), P_{MAX}]$$

During the braking period (i.e., the time during which the driver indicates the vehicle is to be stopped), $P_{DRV}$ is applied through the brake system 22 to hold the vehicle stationary. When the driver releases pressure from the brake pedal 40, the brake line pressure decreases. The brake pressure line-lock solenoid 50 is actuated ON to hold the brake pressure at approximately $P_{HOLD}$. In this manner, the brake system 22 inhibits vehicle rollback as the driver release pressure on the brake pedal 40. The brake pressure line-lock solenoid 50 remains ON and holds the brake pressure until a brake pressure release (BPR) routine is initiated.

The BPR routine can be initiated in several manners based on the particular configuration of the vehicle. For example, for a hybrid electric vehicle that is driven by the engine 12 and/or an electric motor 60 (shown in phantom), the brake pressure is ramped down based on the engine RPM (ERPM) and/or the electric motor RPM (MRPM). The ramp down rate can be increased based on an accelerator pedal position (APP). For example, if the APP is greater than a threshold APP ($APP_{THR}$) (i.e., indicating an aggressive acceleration from rest), the ramp down rate is increased.

For more conventional vehicles that include a fueled idle-state (i.e., the engine is rotating at an idle RPM during stop), the ramp down rate is provided as a calibratable slope. More specifically, the ramp down rate is pre-programmed into memory and is based on the vehicle configuration. The ramp down rate can be increased based on the APP. For example, if the APP is greater than $APP_{THR}$ (i.e., indicating an aggressive acceleration from rest), the ramp down rate is increased.

Alternatively, the BPR routine can be initiated after a threshold time ($t_{THR}$) has expired after the brake pressure line-lock solenoid 50 was originally actuated ON. After $t_{THR}$ expires, the brake pressure is ramped down based on a calibratable slope.

As another alternative, initiation of the BPR routine can be adapted for a fidget-foot driver (i.e., a driver that cyclically releases and depresses the brake pedal 40). More specifically, the brake pressure line-lock solenoid 50 is actuated OFF when the difference between $P_{PDRV}$ and $P_{HOLD}$ is greater than a hysteresis brake pressure ($P_{HYST}$). For example, if the driver has started releasing the brake pedal 40, $P_{DRV}$ decays (e.g., from 300 psi to 290 psi to 280 psi . . . . to 200 psi ($P_{HOLD}$)). At $P_{HOLD}$ (e.g., 200 psi), the brake pressure line-lock solenoid 50 is actuated ON to trap or hold the line pressure. Normally, the driver would continue to release the brake pedal and the BPR routine would be initiated as described above.

In the case of a fidget-foot driver, just as the brake pressure line-lock solenoid is actuated ON, the driver increases pressure on the brake pedal 40. The vehicle will not roll back in this case because the driver is again applying $P_{BRAKE}$ that is greater than $P_{HOLD}$. Therefore, if $P_{DRV}$ is again greater than $P_{HOLD}$ by $P_{HYST}$ (e.g., 50 psi), the brake pressure line-lock solenoid 50 is actuated OFF. As a result, the vehicle is again held stationary based on $P_{DRV}$.

It is further anticipated that the anti-rollback control of the present invention can enhance safety and drivability in conventional vehicle systems (i.e., non-hybrid electric). For example, in a conventional vehicle system having an automatic transmission and that is with or without neutral idle, the $P_{HOLD}$ activation and release can be based on forward or reverse clutch fill. More specifically, the BPR routine is initiated and $P_{BRAKE}$ is ramped down from $P_{HOLD}$ based on the fill rate of a transmission clutch (not shown) that initiates forward propulsion of the vehicle. As the clutch fills and engages the forward drive gear, the brake pressure decreases to enable uninhibited forward motion upon clutch lock-up.

For a conventional vehicle system having a manual transmission, the BPR routine is initiated based on an engine torque threshold ($T_{ENGTHR}$) that is determined based on APP. More specifically, $T_{ENGTHR}$ is determined based on APP. When the engine torque ($T_{ENG}$) exceeds $T_{ENGTHR}$, the BPR routine is initiated. For example, for low APP, a moderately large engine torque is required because the engine RPM slowly increases at a low APP. For a high APP (i.e., accelerator pedal depressed more deeply), the required engine torque to initiate the BPR routine is lower since the torque increases more rapidly. Also, if the APP is high, it is assumed that the driver desires a rapid acceleration. Therefore, the BPR routine is initiated sooner.

Figure 2:
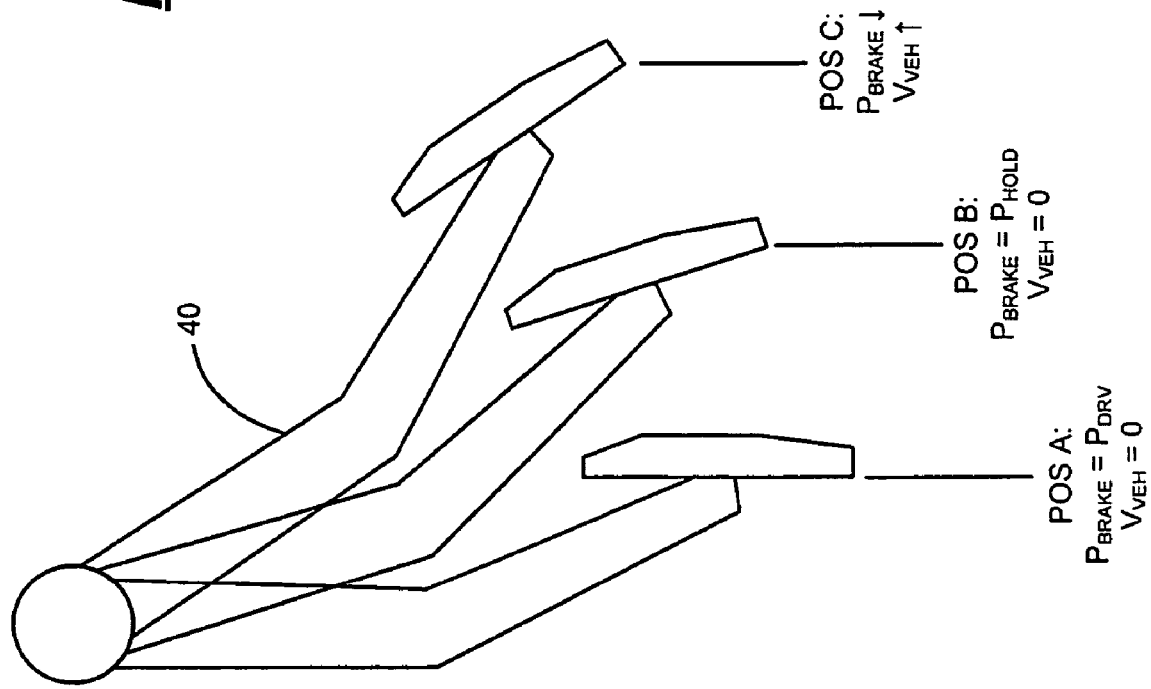
FIG. 2 is a functional block diagram of a brake pedal in a plurality of exemplary positions in accordance with an anti-rollback control of the present invention.

Referring now to FIG. 2, the brake pedal is illustrated in a plurality of exemplary positions. In a first position (POS A), the brake pedal is depressed by the driver. $P_{DRV}$ is greater than or equal to $P_{HOLD}$ and is determined based on the BPS. $P_{BRAKE}$ is equal to $P_{DRV}$ and the vehicle speed ($V_{VEH}$) is equal to zero. In a second position (POS B), the driver has begun releasing pressure on the brake pedal sufficient enough to reduce $P_{BRAKE}$ but insufficient to induce forward propulsion of the vehicle. At POS B, $P_{BRAKE}$ is equal to $P_{HOLD}$, via actuation of the brake pressure line-lock solenoid to the ON state, and $V_{VEH}$ is equal to zero. In a third position (POS C), forward propulsion of the vehicle is initiated and $V_{VEH}$ increases. $P_{BRAKE}$ decreases from $P_{HOLD}$ in a manner described in detail above.

Figure 3:
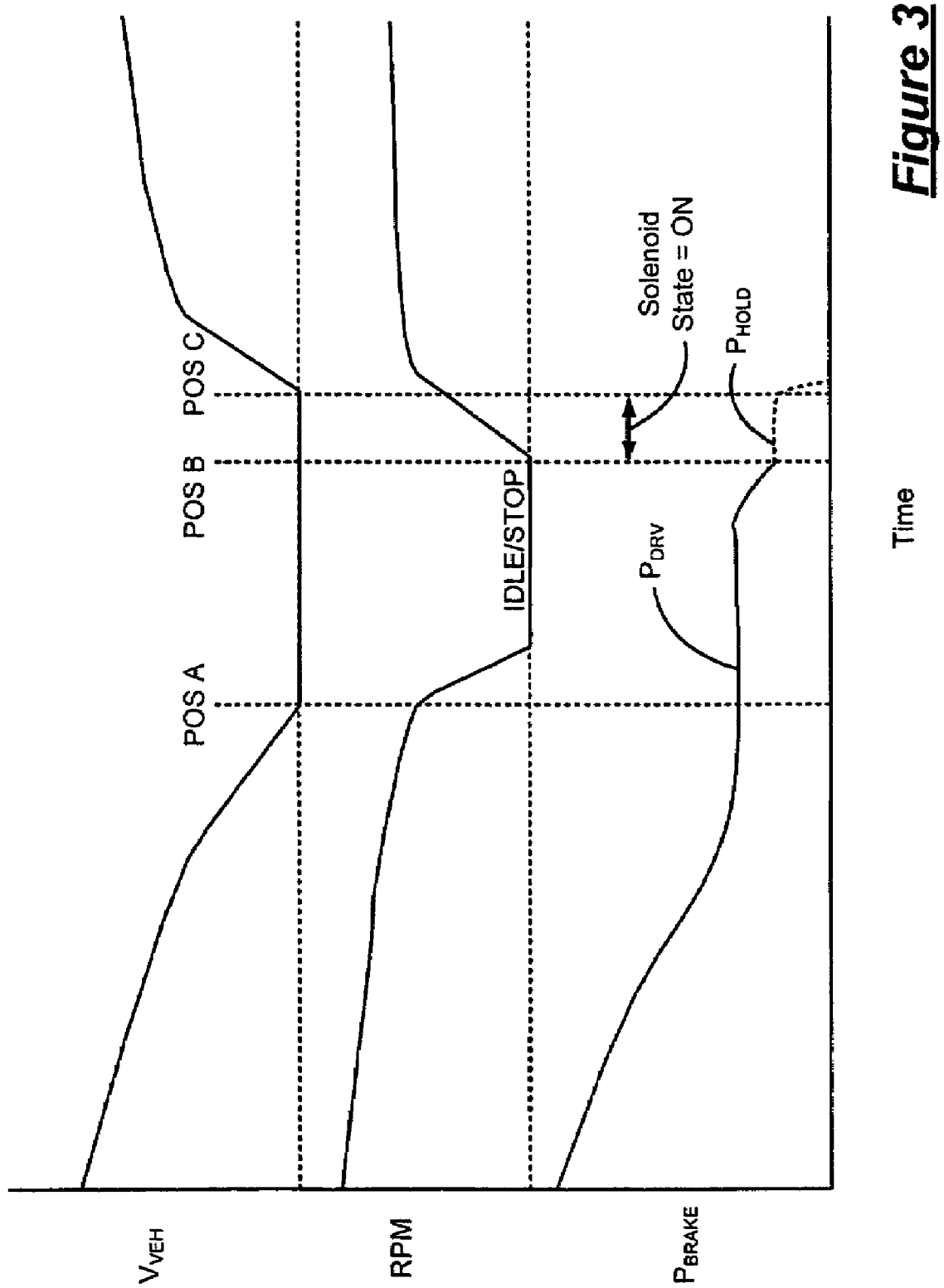
FIG. 3 is a graph illustrating exemplary operating parameter curves in accordance with the anti-rollback control of the present invention.

Referring now to FIG. 3, a graph illustrates exemplary $V_{VEH}$, RPM and $P_{BRAKE}$ curves. $P_{BRAKE}$ decreases as the vehicle rolls to a stop. Once stopped, $P_{BRAKE}$ is held at $P_{DRV}$ based on the pressure applied by the driver to the brake pedal 40. When the driver initiates vehicle acceleration from stop, pressure on the brake pedal 40 is released and $P_{BRAKE}$ decreases to $P_{HOLD}$, at which point the brake pressure line-lock solenoid is actuated ON to hold $P_{BRAKE}$ at $P_{HOLD}$. $P_{BRAKE}$ decreases from $P_{HOLD}$ once the BPR routine is initiated.

Figure 4:
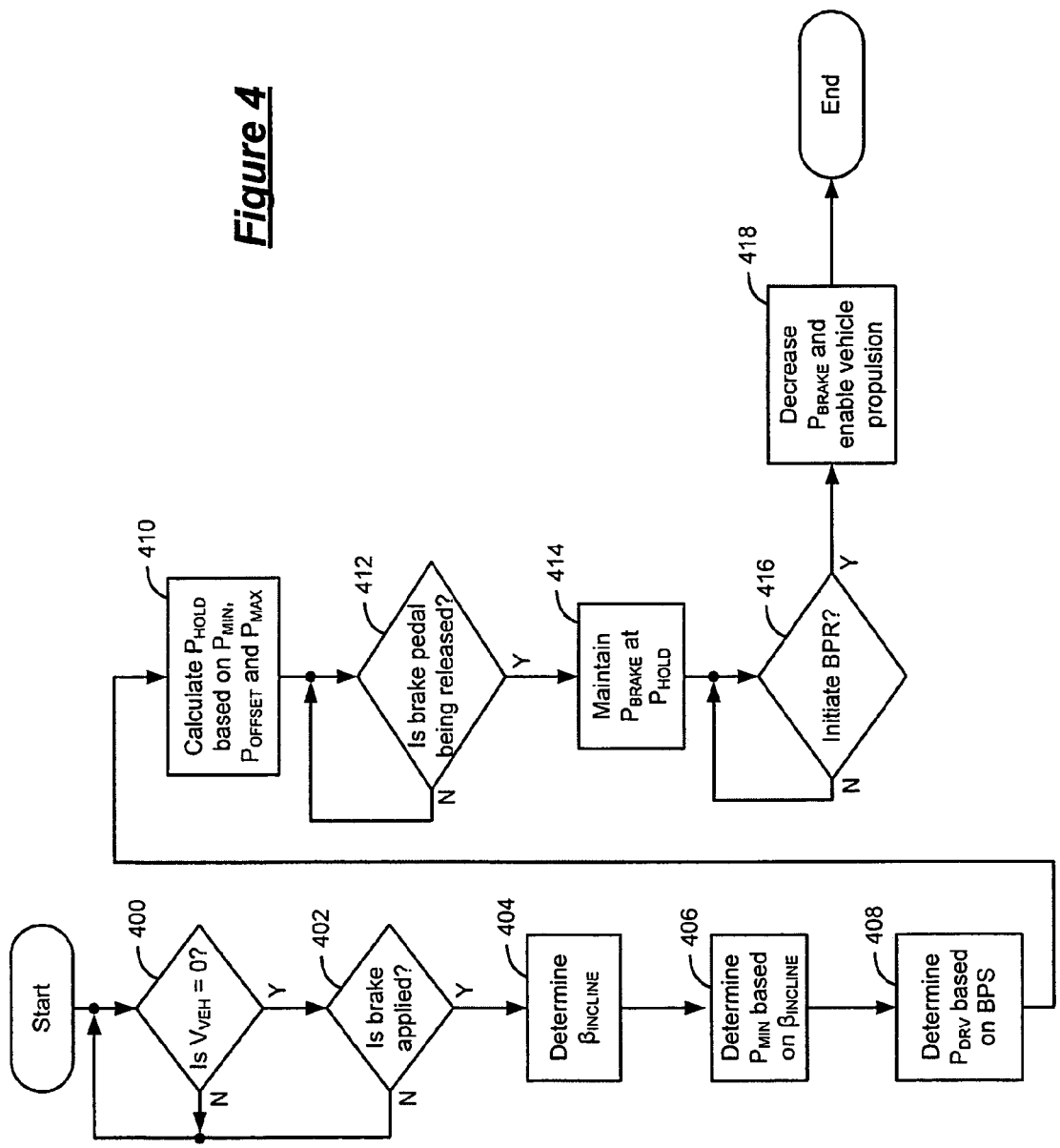
FIG. 4 is a flowchart illustrating exemplary steps executed by an anti-rollback control according to the present invention.

Referring now to FIG. 4, exemplary steps executed by the anti-rollback control of the present invention will be described in detail. In step 400, control determines whether $V_{VEH}$ is equal to zero. If $V_{VEH}$ is not equal to zero, control loops back. If $V_{VEH}$ is equal to zero, control determines whether the brake is applied is step 402. If the brake is not applied, control loops back to step 400. If the brake is applied, control determines $\beta_{INCLINE}$ in step 404. In step 406, control determines $P_{MIN}$ based on $\beta_{INCLINE}$. Control determines $P_{DRV}$ based on BPS in step 408. In step 410, control calculates $P_{HOLD}$ based on $P_{MIN}$, $P_{DRV}$ and $P_{MAX}$.

In step 412, control determines whether the brake pedal is being released (i.e., whether driver is relieving pressure on brake pedal). If the brake pedal is not being released, control loops back. If the brake pedal is being released control continues in step 414. In step 414, control actuates the brake pressure line-lock solenoid to the ON state when $P_{BRAKE}$ is equal to $P_{HOLD}$ to maintain $P_{BRAKE}$ at $P_{HOLD}$. In step 416, control determines whether to initiate BPR. If BPR is not to be initiated, control loops back. If BPR is to be initiated, control actuates the brake pressure line-lock solenoid 50 to the OFF state to decrease $P_{BRAKE}$ from $P_{HOLD}$, enables forward vehicle propulsion and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An anti-rollback control system for a vehicle having a brake system, comprising:
    a brake pedal that is operable to induce a brake pressure in said brake system; and
    a control module that holds said brake pressure equal to a hold pressure that is based on an incline angle to inhibit rollback of said vehicle when pressure is relieved from said brake pedal, that initiates forward propulsion of said vehicle based on a driver input and that reduces said brake pressure from said hold pressure concurrent to initiating said forward propulsion, wherein said control module determines said hold pressure based on a minimum hold pressure, a driver pressure, and a maximum hold pressure.

2. The anti-rollback control system of claim 1 wherein said control module gradually reduces said brake pressure to zero.

3. The anti-rollback control system of claim 2 wherein said gradual reduction is based on a rotational speed of a propulsion mechanism.

4. The anti-rollback control system of claim 2 wherein said gradual reduction is based on a clutch-fill rate of a transmission.

5. The anti-rollback control system of claim 1 wherein said minimum hold pressure is determined based on said incline angle.

6. The anti-rollback control system of claim 1 further comprising an inclinometer that determines said incline angle.

7. The anti-rollback control system of claim 1 wherein said incline angle is determined based on an incline model.

8. The anti-rollback control system of claim 1 further comprising a brake pressure line-lock solenoid that is selectively actuated to hold said brake pressure at said hold pressure.

9. The anti-rollback control system of claim 1 wherein said driver pressure is determined based on a brake pedal position.

10. The anti-rollback control system of claim 1 wherein control module maintains said brake pressure at said hold pressure for a threshold time after initiating forward propulsion of said vehicle.

11. The anti-rollback control system of claim 1 wherein a rate of reduction of said brake pressure from said hold pressure is based on an accelerator pedal position.

12. A method of inhibiting rollback during vehicle launch, comprising:
    relieving a brake pressure of a brake system of a vehicle;
    holding said brake pressure equal to a hold pressure that is based on an incline angle to inhibit rollback of said vehicle;
    initiating forward propulsion of said vehicle; and
    reducing said brake pressure from said hold pressure concurrent to initiating said forward propulsion, wherein said hold pressure is determined based on a minimum hold pressure, a driver pressure, and a maximum hold pressure.

13. The method of claim 12 wherein said brake pressure is gradually reduced to zero.

14. The method of claim 13 wherein said gradual reduction is based on a rotational speed of a propulsion mechanism.

15. The method of claim 13 wherein said gradual reduction is based on a clutch-fill rate of a transmission.

16. The method of claim 12 wherein said driver pressure is determined based on a brake pedal position.

17. The method of claim 12 wherein said minimum hold pressure is determined based on said incline angle.

18. The method of claim 12 wherein said incline angle is determined based on an incline signal generated by an inclinometer.

19. The method of claim 12 wherein said incline angle is determined based on an incline model.

20. The method of claim 12 further comprising actuating a brake pressure line-lock solenoid to hold said brake pressure at said hold pressure.

21. The method of claim 12 wherein a rate of reduction of said brake pressure from said hold pressure is based on an accelerator pedal position.

22. The method of claim 12 wherein said brake pressure is maintained at said hold pressure for a threshold time after initiating forward propulsion of said vehicle.

23. A method of regulating brake pressure of a brake system to inhibit rollback during vehicle launch, comprising:
    decreasing said brake pressure from a driver applied brake pressure;
    maintaining said brake pressure equal to a hold pressure that is less that said driver applied brake pressure and that is based on an incline angle to inhibit rollback of said vehicle;
    initiating forward propulsion of said vehicle based on a driver input; and
    initiating a brake pressure release (BPR) routine to reduce said brake pressure from said hold pressure to enable said forward propulsion, wherein said hold pressure is determined based on a minimum hold pressure, a driver pressure, and a maximum hold pressure.

24. The method of claim 23 wherein said gradual reduction is based on a rotational speed of a propulsion mechanism.

25. The method of claim 24 wherein said gradual reduction is based on a rate of filling of fluid in a transmission.

26. The method of claim 23 further comprising actuating a brake pressure line-lock solenoid to hold said brake pressure at said hold pressure.

27. The method of claim 23 wherein said driver pressure is determined based on a brake pedal position.

28. The method of claim 23 wherein said minimum hold pressure is determined based on said incline angle.

29. The method of claim 23 wherein said incline angle is determined based on an incline signal generated by an inclinometer.

30. The method of claim 23 wherein said brake pressure is gradually reduced to zero.

31. The method of claim 23 wherein said incline angle is determined based on an incline model.

32. The method of claim 23 wherein a rate of reduction of said brake pressure from said hold pressure is based on an accelerator pedal position.

33. The method of claim 23 wherein said brake pressure is maintained at said hold pressure for a threshold time after initiating forward propulsion of said vehicle.

* * * * *

UNITED STATES PATENT AND TRADEMARK OFFICE
CERTIFICATE OF CORRECTION

| | | |
|---|---|---|
| PATENT NO. | : 7,600,827 B2 | Page 1 of 1 |
| APPLICATION NO. | : 11/233870 | |
| DATED | : October 13, 2009 | |
| INVENTOR(S) | : Tamai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 954 days.

Signed and Sealed this

Fifth Day of October, 2010

David J. Kappos
*Director of the United States Patent and Trademark Office*